(12) United States Patent
Harada et al.

(10) Patent No.: US 10,837,516 B2
(45) Date of Patent: Nov. 17, 2020

(54) VIBRATION DAMPING DEVICE

(71) Applicant: BRIDGESTONE CORPORATION, Tokyo (JP)

(72) Inventors: Yoichi Harada, Tokyo (JP); Naoki Maeda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 30 days.

(21) Appl. No.: 16/313,311

(22) PCT Filed: Jun. 15, 2017

(86) PCT No.: PCT/JP2017/022136
§ 371 (c)(1),
(2) Date: Dec. 26, 2018

(87) PCT Pub. No.: WO2018/008352
PCT Pub. Date: Jan. 11, 2018

(65) Prior Publication Data
US 2019/0154110 A1 May 23, 2019

(30) Foreign Application Priority Data
Jul. 4, 2016 (JP) ................................ 2016-132418

(51) Int. Cl.
*F16F 15/08* (2006.01)
*F16F 1/373* (2006.01)
(Continued)

(52) U.S. Cl.
CPC .............. *F16F 15/08* (2013.01); *F16F 1/373* (2013.01); *F16F 1/3807* (2013.01);
(Continued)

(58) Field of Classification Search
CPC ........ F16F 1/3807; F16F 1/3849; F16F 1/387; F16F 1/3873; F16F 1/373; F16F 1/377;
(Continued)

(56) References Cited

U.S. PATENT DOCUMENTS 7,175,166 B2 * 2/2007 Akamatsu ............. F16F 1/3732
267/140.11
2005/0242481 A1 11/2005 Ihara et al.
(Continued)

FOREIGN PATENT DOCUMENTS

JP 2006-161973 A 6/2006
JP 2009-115136 A 5/2009
(Continued)

OTHER PUBLICATIONS

The Extended European Search Report dated Jun. 25, 2019, issued by the European Patent Office in corresponding application No. 17823959.6.
(Continued)

*Primary Examiner* — Thomas J Williams
(74) *Attorney, Agent, or Firm* — Sughrue Mion, PLLC

(57) ABSTRACT

The present invention is a vibration damping device (1, 2) that includes an external member (11, 21) attached to one of a vibration-generating portion and a vibration-receiving portion; a tubular member (40) attached to the other of the vibration-generating portion and the vibration-receiving portion; and an elastic body (30) which connects the external member (11, 21) and the tubular member (40). The external member (11, 21) includes a frame-like member (11, 21)
(Continued)

having a rectangular shape when viewed from the top. In the elastic body (30), a long-side portion (32*a*) forming a long side of a rectangular shape when viewed from the top adheres to an inner circumferential surface of the long-side portion (12*a*, 12*b*) of the frame-like member (11, 21), and a short-side portion (32*b*) forming a short side of the rectangular shape when viewed from the top comes into contact with the external member (11, 21) in a long-side direction (X) in which the long-side portion (12*a*, 12*b*) extends when viewed from the top, in a non-adhering state.

4 Claims, 4 Drawing Sheets

(51) Int. Cl.
*F16F 1/38* (2006.01)
*F16F 1/44* (2006.01)
*F16F 1/387* (2006.01)
*F16F 1/377* (2006.01)
*F16F 1/54* (2006.01)

(52) U.S. Cl.
CPC .......... *F16F 1/3849* (2013.01); *F16F 1/3873* (2013.01); *F16F 1/377* (2013.01); *F16F 1/44* (2013.01); *F16F 1/54* (2013.01); *F16F 2224/025* (2013.01); *F16F 2228/08* (2013.01); *F16F 2230/0005* (2013.01); *F16F 2236/04* (2013.01); *F16F 2236/10* (2013.01)

(58) Field of Classification Search
CPC ...... F16F 1/44; F16F 1/54; F16F 15/08; F16F 2224/025; F16F 2228/08; F16F 2236/04; F16F 2236/10
See application file for complete search history.

(56) References Cited

U.S. PATENT DOCUMENTS

| | | | | |
|---|---|---|---|---|
| 2010/0276853 | A1* | 11/2010 | Visage | ................. F16F 1/3849 267/140.4 |
| 2012/0267184 | A1* | 10/2012 | Joly | ........................ F16F 1/373 180/291 |
| 2012/0267186 | A1* | 10/2012 | Hermann | ............. B60K 5/1208 180/382 |
| 2016/0305505 | A1 | 10/2016 | Kadowaki | |
| 2016/0341275 | A1* | 11/2016 | Kaneko | ................... F16F 15/08 |

FOREIGN PATENT DOCUMENTS

| | | |
|---|---|---|
| JP | 2011214608 A | 10/2011 |
| JP | 2014-145471 A | 8/2014 |
| JP | 2014-185690 A | 10/2014 |
| JP | 2015-178883 A | 10/2015 |
| WO | 2015/072209 A1 | 5/2015 |

OTHER PUBLICATIONS

International Search Report for PCT/JP2017/022136 dated Sep. 19, 2017 [PCT/ISA/210].

* cited by examiner

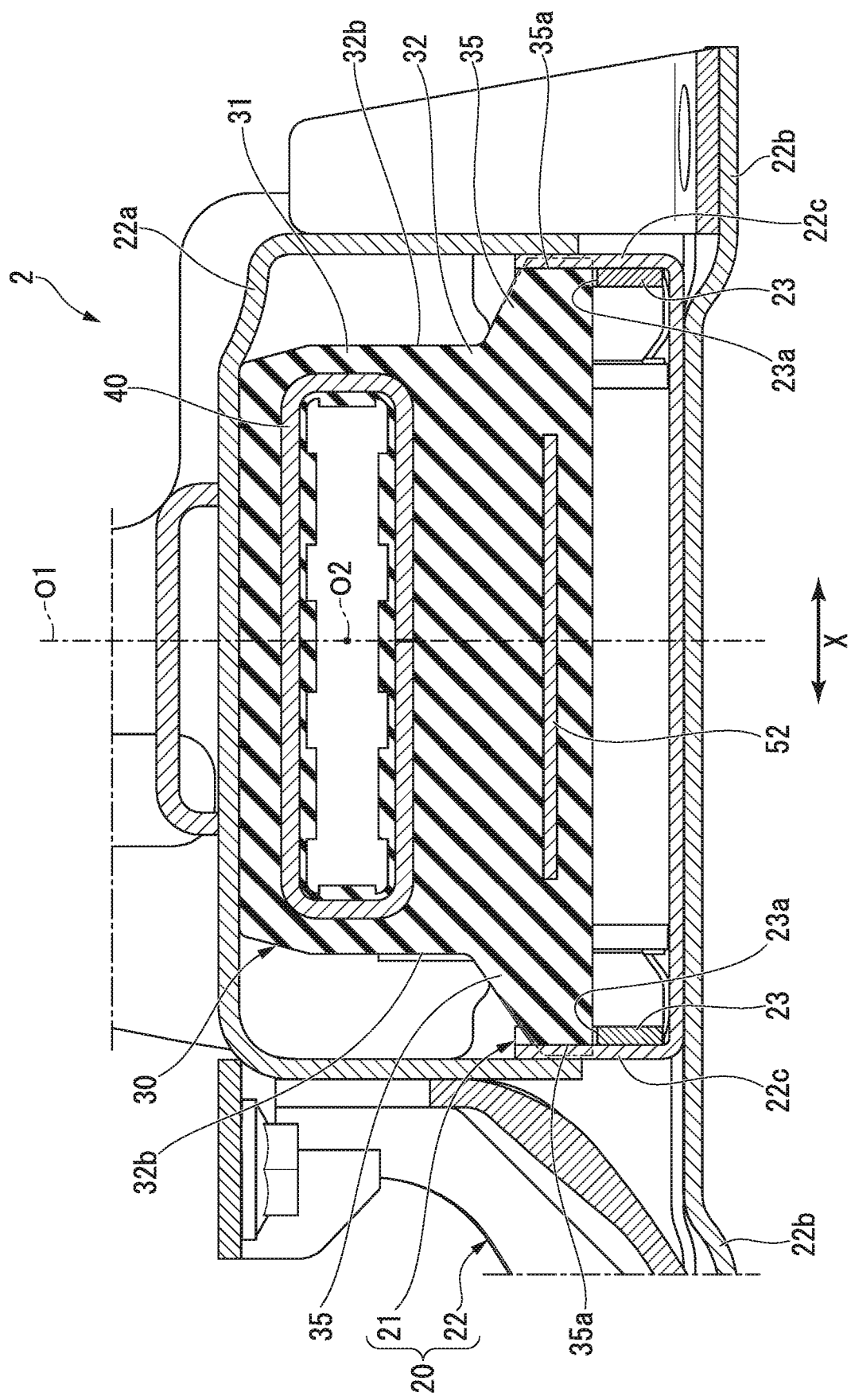

VIBRATION DAMPING DEVICE

TECHNICAL FIELD

The present invention relates to a vibration damping device. This application is a National Stage of International Application No. PCT/JP2017/022136, filed on Jun. 15, 2017, which claims priority from Japanese Patent Application No. 2016-132418, filed Jul. 4, 2016, the contents of all of which are incorporated herein by reference.

BACKGROUND ART

In the related art, for example, as shown in Patent Document 1 below, a vibration damping device equipped with a tubular outer attachment member attached to one of a vibration-generating portion and a vibration-receiving portion, a tubular inner attachment member attached to the other of the vibration-generating portion and the vibration-receiving portion and disposed inside the outer attachment member, and an elastic body disposed between the outer attachment member and the inner attachment member to elastically connect an inner circumferential surface of the outer attachment member and an outer circumferential surface of the inner attachment member to each other is known. Central axes of each of the outer attachment member and the inner attachment member extend parallel to each other in a state in which their positions are shifted from each other. In the vibration damping device, when vibration in a radial direction or a vertical direction is input, since the elastic body is subjected to compressive deformation rather than shear deformation, the vibration can be reliably attenuated and absorbed.

CITATION LIST

Patent Document

[Patent Document 1]
Japanese Unexamined Patent Application, First Publication No. 2009-115136

SUMMARY OF INVENTION

Technical Problem

However, in the aforementioned vibration damping device of the related art, when vibration in an axial direction along the respective central axes of the outer attachment member and the inner attachment member is input, since the elastic body is subjected to not compressive deformation but shear deformation, there is a likelihood that it will not be possible to sufficiently attenuate and absorb the vibration.

The present invention has been made in view of such circumstances, and an object thereof is to provide a vibration damping device capable of reliably attenuating and absorbing an input vibration irrespective of the input direction of the vibration.

Means for Solving the Problem

According to an aspect of the present invention, a vibration damping device is provided, including: an external member attached to one of a vibration-generating portion and a vibration-receiving portion; a tubular member attached to the other of the vibration-generating portion and the vibration-receiving portion; and an elastic body which connects the external member and the tubular member, wherein the external member includes a frame-like member having a rectangular shape when viewed from the top, the elastic body is formed in a rectangular parallelepiped shape having a rectangular shape when viewed from the top, the tubular member is disposed inside the frame-like member when viewed from the top, a central axis of the tubular member extends in a short-side direction in which a short-side portion of the frame-like member forming a short side of the rectangular shape when viewed from the top extends, in the frame-like member, a lower end edge of a long-side portion forming a long side of the rectangular shape when viewed from the top is located on an inner side than an upper end edge of the long-side portion in the short-side direction, and in the elastic body, a long-side portion forming a long side of the rectangular shape when viewed from the top adheres to an inner circumferential surface of the long-side portion of the frame-like member, and a short-side portion forming a short side of the rectangular shape when viewed from the top comes into contact with the external member in a long-side direction in which the long-side portion extends when viewed from the top, in a non-adhering state.

Advantageous Effects of Invention

According to the present invention, it is possible to reliably attenuate and absorb an input vibration, irrespective of the input direction of the vibration.

BRIEF DESCRIPTION OF DRAWINGS

FIG. 6 is a vertical cross-sectional view taken along the long-side direction of the vibration damping device shown in FIG. 5.

DESCRIPTION OF EMBODIMENTS

First Embodiment

Figure 1:
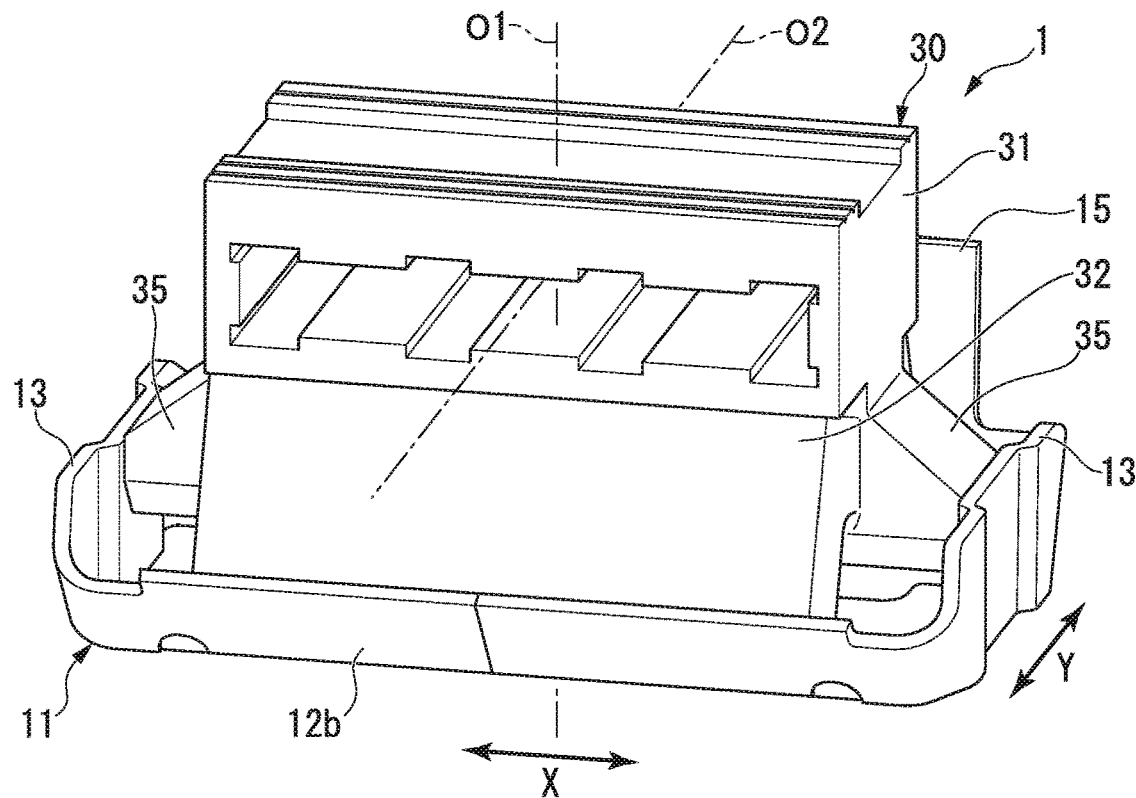
FIG. 1 is a perspective view of a vibration damping device according to a first embodiment of the present invention.

Hereinafter, a vibration damping device according to a first embodiment of the present invention will be described with reference to FIGS. 1 to 4. As shown in FIGS. 1 and 3, a vibration damping device 1 includes a frame-like member (an external member) 11 attached to one of a vibration-generating portion and a vibration-receiving portion, a tubular member 40 attached to the other of the vibration-generating portion and the vibration-receiving portion, and an elastic body 30 which connects the frame-like member 11 and the tubular member 40. Hereinafter, a direction extending along a central axis O1 of the frame-like member 11 is referred to as a vertical direction. Positions of each of the frame-like member 11 and the tubular member 40 in the vertical direction are different from each other. Hereinafter, in the vertical direction, a side on which the tubular member 40 is located is referred to as an upper side, and a side on which the frame-like member 11 is located is referred to as a lower side.

The frame-like member 11 has a rectangular shape when viewed from the top, and the elastic body 30 is formed in a rectangular parallelepiped shape having a rectangular shape when viewed from the top. Hereinafter, when viewed from the top, in the frame-like member 11, a direction in which long-side portions 12a and 12b forming a rectangular long side extend is referred to as a long-side direction X, and a direction in which a short-side portion 13 forming a rectangular short side extends is referred to as a short-side direction Y. In addition, when viewed from the top, the tubular member 40 is disposed inside the frame-like member 11, and a central axis O2 of the tubular member 40 extends in the short-side direction Y. Here, for example, the vibration-receiving portion is a vehicle body or the like, and the vibration-generating portion is an engine or the like mounted on the vehicle body. The vibration damping device 1 is mounted on the vehicle so that the long-side direction X coincides with a front-rear direction of the vehicle body and the short-side direction Y coincides with a left-right direction of the vehicle body. Further, an orientation of the vibration damping device 1 with respect to the vehicle body is not limited thereto.

Figure 2:
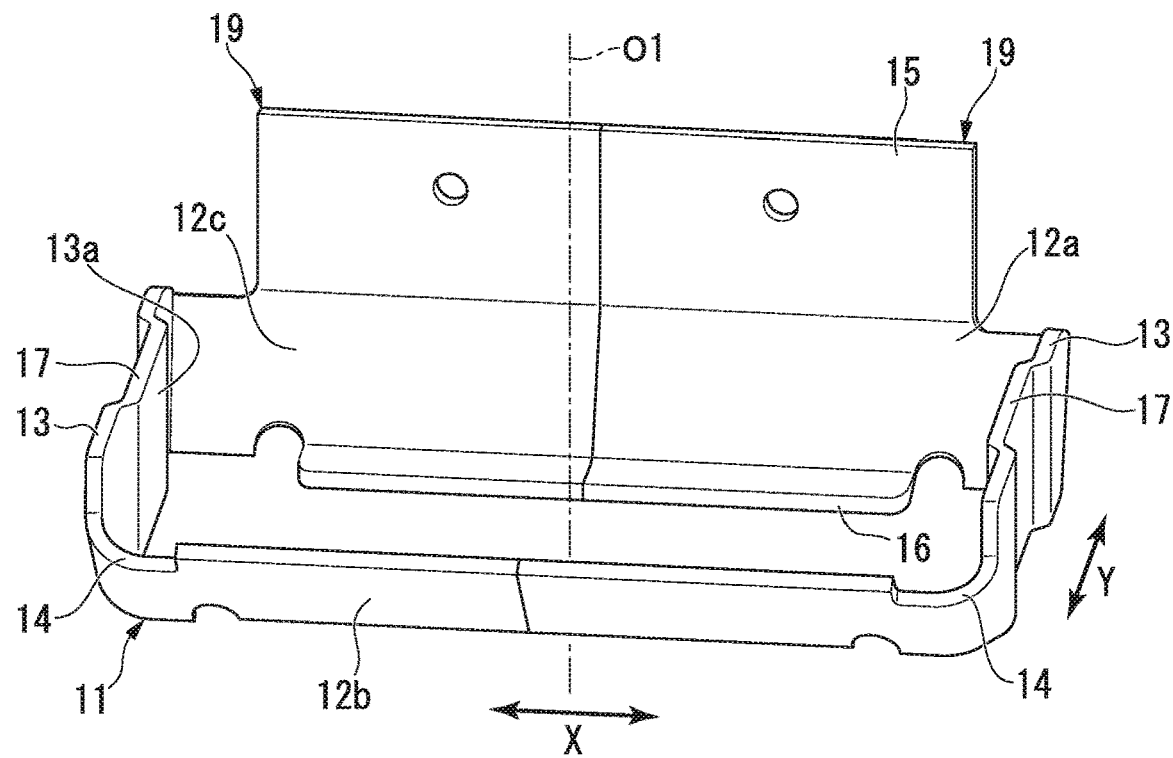
FIG. 2 is a perspective view of a frame-like member of the vibration damping device shown in FIG. 1.
Figure 3:
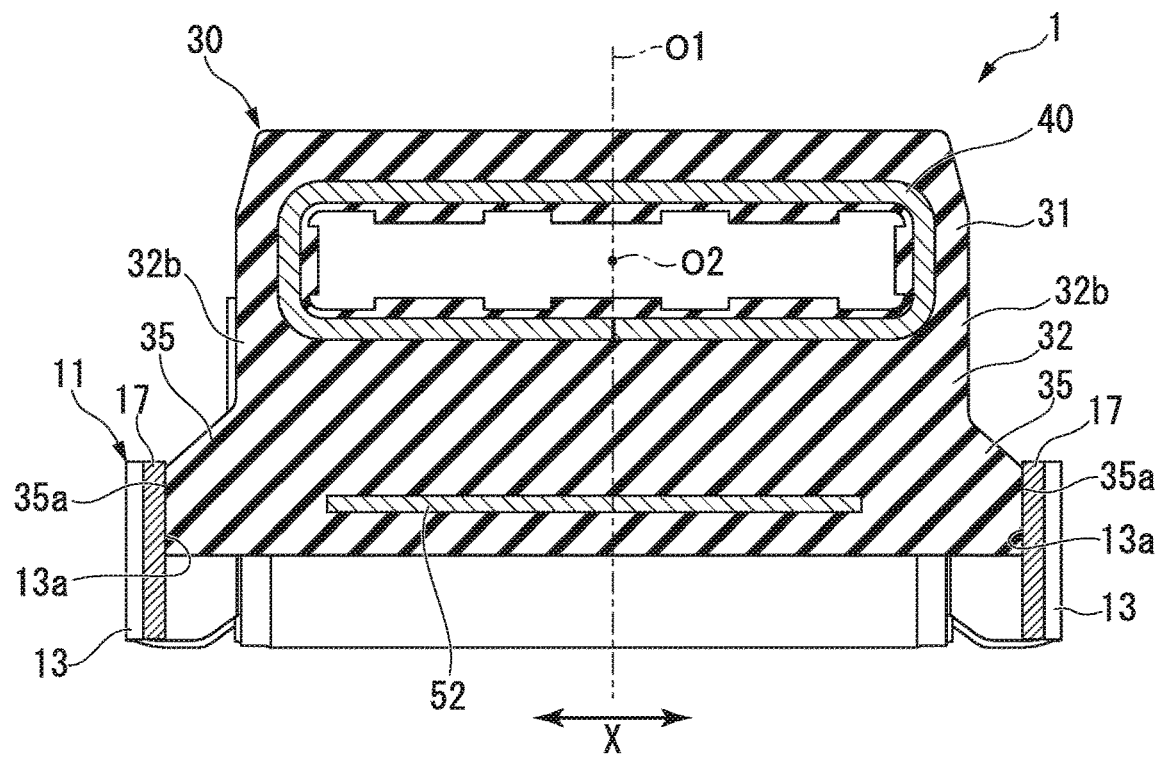
FIG. 3 is a vertical cross-sectional view taken along a long-side direction of the vibration damping device shown in FIG. 1.

As shown in FIG. 2, the frame-like member 11 includes a pair of long-side portions 12a and 12b facing each other in the short-side direction Y, a pair of short-side portions 13 facing each other in the long-side direction X, and a connecting portion 14 which connects the long-side portions 12a and 12b and the short-side portion 13 around the central axis O1 and forms a corner portion having a rectangular shape when viewed from the top. Further, a back plate 15 extending upward is formed on an upper end edge of the one long-side portion 12a located on one side in the short-side direction Y, of the pair of long-side portions 12a and 12b. The back plate 15 is integrally formed with the one long-side portion 12a. Here, the vibration damping device 1 is mounted on the vehicle such that the one side in the short-side direction Y coincides with the left side of the vehicle body and the other side thereof coincides with the right side of the vehicle body.

The frame-like member 11 includes two separate frame-like members 19 which are equally divided into two parts in the long-side direction X, and inner end edges of the separate frame-like members 19 in the long-side direction X are connected to each other. The frame-like member 11 is formed of, for example, a metallic material, a resin material, or the like. When the two separate frame-like members 19 are formed of a metallic material, they are connected by welding, brazing, or the like. When the two separate frame-like members 19 are formed of a resin material, they are connected by adhesion, fusion, welding-deposition, or the like.

Figure 4:
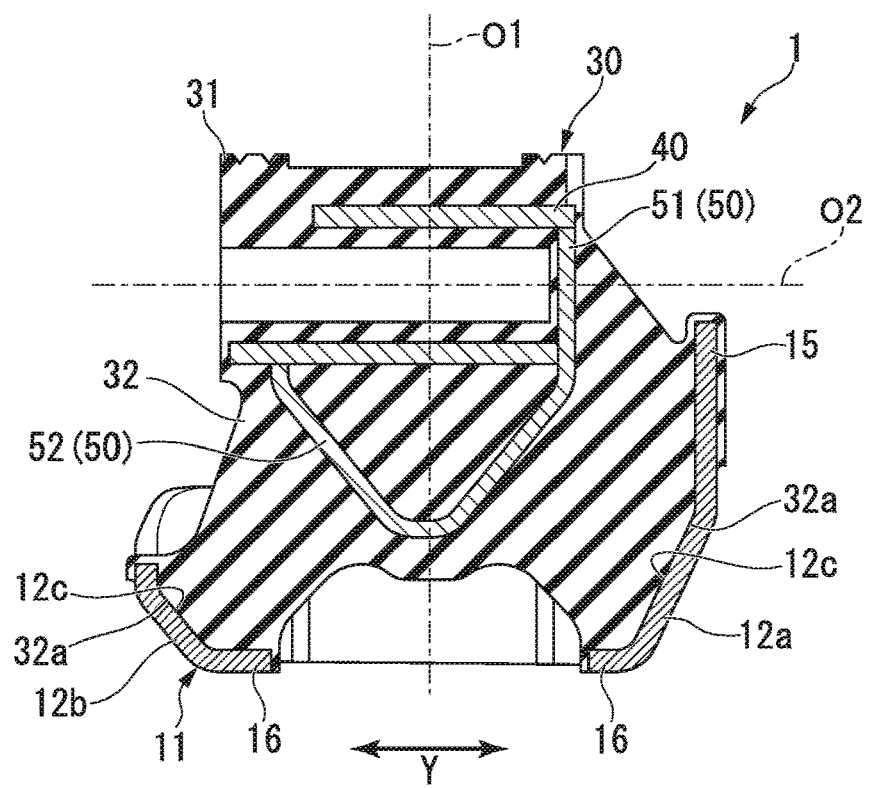
FIG. 4 is a vertical cross-sectional view taken along a short-side direction of the vibration damping device shown in FIG. 1.

The frame-like member 11 is formed of a plate material. A plate thickness of the frame-like member 11 is uniform over an entire circumference around the central axis O1. The plate thickness of the frame-like member 11 is smaller than dimensions in the vertical direction of the long-side portions 12a and 12b and the short-side portion 13 in the frame-like member 11. In the frame-like member 11, the size in the vertical direction of the short-side portion 13 is larger than the dimensions in the vertical direction of the long-side portions 12a and 12b. As shown in FIG. 4, among the pair of long-side portions 12a and 12b, the size in the vertical direction of the other long-side portion 12b located on the other side in the short-side direction Y is smaller than that of one long-side portion 12a. As shown in FIG. 2, the connecting portion 14 has a curved shape protruding outward from the frame-like member 11 when viewed from the top.

As shown in FIGS. 2 and 4, the long-side portions 12a and 12b of the frame-like member 11 includes a receiving portion 16 that protrudes inward in the short-side direction Y. The receiving portion 16 is formed at the lower end edges of each of the pair of long-side portions 12a and 12b. In the shown example, the receiving portion 16 is integrally formed with the long-side portions 12a and 12b. An amount of protrusion of the receiving portion 16 formed on the one long-side portion 12a is smaller than an amount of protrusion of the receiving portion 16 formed on the other long-side portion 12b. Further, the receiving portion 16 may be formed on only one of the pair of long-side portions 12a and 12b or may not be formed on the frame-like member 11. Further, the receiving portion 16 may be disposed above the lower end edges of the pair of long-side portions 12a and 12b. Also, as shown in FIG. 2, a pre-compressed portion 17 is formed in the central portion in the short-side direction Y of the short-side portion 13. In the pre-compressed portion 17, of a central portion of the short-side portion 13 in the short-side direction Y, an outer surface facing outside in the long-side direction X is recessed toward the inside in the long-side direction X, and an inner surface facing the inside in the long-side direction X protrudes toward the inside in the long-side direction X.

As shown in FIG. 3, the tubular member 40 has a rectangular shape longer in the long-side direction X than in the vertical direction when viewed in a vertical cross-sectional view taken along the long-side direction X. The thickness of the tubular member 40 is the same over the entire circumference and an entire region in the short-side direction Y. The tubular member 40 is covered with the elastic body 30 over the entire region. The tubular member 40 is made of, for example, a metallic material or the like. Further, the tubular member 40 may have another tubular shape such as a cylinder, or may be formed of a material other than a metallic material.

As shown in FIG. 4, an auxiliary fitting 50 is disposed on the tubular member 40. The auxiliary fitting 50 includes a closing plate 51 that closes an opening on one side of the tubular member 40 in the short-side direction Y, and a lower member 52 that is disposed below the tubular member 40 and has a V shape when viewed in a vertical cross-sectional view taken along the short-side direction Y. The lower member 52 gradually extends downward from the outer side to the inner side in the short-side direction Y. The lower member 52 extends in the long-side direction X and is formed in a half-tubular shape that opens upward. The pair of upper end edges of the lower member 52 is disposed in the short-side direction Y and extends in the long-side direction X.

Of the pair of upper end edges of the lower member 52, a portion located on one side in the short-side direction Y is connected to the lower end edge of the closing plate 51, and a portion located on the other side in the short-side direction Y is in contact with or in proximity to the lower surface of the tubular member 40. The central portions of each of the lower member 52 and the tubular member 40 in the short-side direction Y are located at the same position. The lower member 52 and the pair of long-side portions 12a and 12b of the frame-like member 11 face each other via a main body rubber 32 to be described later of the elastic body 30. The auxiliary fitting 50 is embedded in the elastic body 30, together with the tubular member 40. Further, the auxiliary fitting 50 may not disposed in the tubular member 40.

As shown in FIG. 1, the elastic body 30 includes a covering portion 31 that covers the inner circumferential surface and the outer circumferential surface of the tubular member 40, and a main body rubber 32 connected to the inner circumferential surface of the frame-like member 11. As shown in FIG. 4, the covering portion 31 also covers a front surface and a back surface of the closing plate 51 of the auxiliary fitting 50. The tubular member 40 is attached to the vibration-generating portion or the vibration-receiving portion, by inserting a connecting member (not shown) into the inside of the tubular member 40 through the covering portion 31.

The main body rubber 32 is formed in a rectangular parallelepiped shape having a rectangular shape which is long in the long-side direction X when viewed from the top. In the main body rubber 32, the long-side portion 32a forming a long side of a rectangular shape when viewed from the top extends gradually toward the outer side in the short-side direction Y as it goes downward. The main body rubber 32 covers the inner surface of the outer surface of the back plate 15 facing the inner side in the short-side direction Y over the entire region. As shown in FIGS. 1 and 3, protruding portions 35 protruding outward in the long-side direction X are formed at both end portions of the main body rubber 32 in the long-side direction X.

The protruding portion 35 has a laterally trapezoidal shape in which an upper base is located at the outer end in the long-side direction X and a lower base is located at an inner end in the long-side direction X when viewed from the short-side direction Y, and is formed in a quadrangular prism shape. When viewed from the short-side direction Y, of the front surface of the protruding portion 35, the lower surface forming one trapezoidal leg extends in the long-side direction X, and an upper surface forming the other leg gradually extends downward toward the outer side in the long-side direction X. A size of the protruding portion 35 in the short-side direction Y is smaller than a size thereof in the vertical direction at the inner end of the protruding portion 35 in the long-side direction X. Further, as shown in FIG. 4, of the lower surface of the main body rubber 32, a portion located inside of the frame-like member 11 in the short-side direction Y is formed into a concave curved surface that is recessed upward.

Further, in the present embodiment, the lower end edges of the long-side portions 12a and 12b of the frame-like member 11 are located on the inner side in the short-side direction Y than the upper end edges of the long-side portions 12a and 12b. In the shown example, the inner circumferential surfaces 12c of the long-side portions 12a and 12b of the frame-like member 11 are gradually inclined toward the inner side in the short-side direction Y as they go downward. An inclination angle of one long-side portion 12a of the frame-like member 11 with respect to a horizontal plane orthogonal to the central axis O1 of the frame-like member 11 is greater than an inclination angle of the other long-side portion 12b with respect to the horizontal plane orthogonal to the central axis O1 of the frame-like member 11. Further, the long-side portions 12a and 12b of the frame-like member 11 may have, for example, an L shape (a shape bent at a right angle) when viewed in the vertical cross-sectional view taken along the short-side direction Y, and the lower end edges of the long-side portions 12a and 12b may be located on the inner side in the short-side direction Y than the upper end edges of the long-side portions 12a and 12b.

Further, in this embodiment, the long-side portion 32a of the main body rubber 32 forming the long side of the rectangular shape when viewed from the top is adhered to the inner circumferential surfaces 12c of the long-side portions 12a and 12b of the frame-like member 11. The long-side portion 32a of the main body rubber 32 is vulcanization-adhered to the inner circumferential surfaces 12c of the long-side portions 12a and 12b of the frame-like member 11 and the inner surface of the back plate 15.

Further, the short-side portion 32b of the main body rubber 32 forming a short side of the rectangular shape when viewed from the top is in contact with the frame-like member 11 in a non-adhering state. As shown in FIGS. 1 and 3, the protruding portion 35 of the elastic body 30 is in contact with a portion of the inner circumferential surface 13a of the short-side portion 13 of the frame-like member 11 at which the pre-compressed portion 17 is located. Further, the outer surface 35a of the protruding portion 35 that faces the outer side in the long-side direction X is in contact with the inner circumferential surface 13a of the short-side portion 13 of the frame-like member 11.

Further, in the present embodiment, the short-side portion 32b of the main body rubber 32 is pre-compressed in the long-side direction X. In the shown example, when the outer surface 35a of the protruding portion 35 of the elastic body 30 is pressed toward the inner side in the long-side direction X by the portion of the inner circumferential surface 13a of the short-side portion 13 of the frame member 11 in which the pre-compressed portion 17 is located, the elastic body 30 is pre-compressed in the long-side direction X. Further, the pre-compressed portion 17 may not be formed in the short-side portion 13 of the frame-like member 11, and the outer surface 35a of the protruding portion 35 of the elastic body 30 may be in contact with the inner circumferential surface 13a of the short-side portion 13 over the entire region in the short-side direction Y, and may be pressed toward the inner side of the long-side direction X.

Next, an example of a method of manufacturing the vibration damping device 1 according to the present embodiment will be described. The frame-like member 11 is formed by press-forming a metallic plate material to form two divided frame-like members 19 symmetrical with each other in the long-side direction X, and by causing the inner end edges of the two divided frame-like members 19 in the long-side direction X to abut and welding and joining the inner end edges. Next, the tubular member 40 and the auxiliary fitting 50 are welded and joined together, the frame-like member 11, the tubular member 40 and the auxiliary fitting 50 are set in a mold, and the elastic body 30 is vulcanized by insert molding. At this time, the elastic body 30 is molded by vulcanization such that the elastic body 30 and the inner circumferential surfaces 12c of the long-side portions 12a and 12b of the frame-like member 11 adhere to each other, such that the elastic body 30 and the inner surface of the back plate 15 adhere to each other, and such that the elastic body 30 and the inner circumferential surface 13a of the short-side portion 13 of the frame-like member 11 do not adhere to each other.

Thereafter, the central portion in the short-side direction Y of the short-side portion 13 of the frame-like member 11 is pressed toward the inner side in the long-side direction X and plastically deformed to form the pre-compressed portion 17. As a result, the portion of the inner circumferential surface 13a of the frame-like member 11 in which the pre-compressed portion 17 is located presses the outer surface 35a of the protruding portion 35 of the elastic body 30 toward the inner side in the long-side direction X. The pre-compressed portion 17 of the short-side portion 13 may not be formed after vulcanization-molding of the elastic body 30 and may be formed at the time of press-molding for forming the divided frame-like member 19.

As described above, according to the vibration damping device 1 of the present embodiment, the lower end edges of the long-side portions 12a and 12b of the frame-like member 11 are located on the inner side in the short-side direction Y than the upper end edges of the long-side portions 12a and 12b, and the long-side portion 32a of the main body rubber 32 in the elastic body 30 formed in a rectangular parallelepiped shape adheres to the inner circumferential surfaces 12c of the long-side portions 12a and 12b. Accordingly, when the vibration in the vertical direction is input to the vibration damping device 1, since the long-side portion 32a of the main body rubber 32 is compressively deformed in the vertical direction, it is possible to reliably attenuate and absorb the vibration in the vertical direction. Two long-side portions 32a of the main body rubber 32 in the elastic body 30 separately adhere to the inner circumferential surfaces 12c of the two long-side portions 12a and 12b of the frame-like member 11. Accordingly, when the vibration in the short-side direction Y is input to the vibration damping device 1, since the long-side portion 32a of the main body rubber 32 is compressively deformed in the short-side direction Y, it is possible to reliably attenuate and absorb the vibration in the short-side direction Y.

Further, since the two short-side portions 32b of the main body rubber 32 of the elastic body 30 are separately in contact with the frame-like member 11, when vibration in the long-side direction X is input to the vibration damping device 1, it is possible to compressively deform the short-side portion 32b in the long-side direction X, while performing the shear deformation of the long-side portion 32a of the main body rubber 32 in the long-side direction X. Thus, the vibration which is input to the vibration damping device 1 in the long-side direction X is received by both the long-side portion 32a and the short-side portion 32b of the main body rubber 32 of the elastic body 30, thereby making it possible to reliably attenuate and absorb the vibration which is input to the vibration damping device 1 in the long-side direction X. As described above, irrespective of the direction of vibration, the elastic body 30 is easily compressively deformed, and it is possible to reliably attenuate and absorb the vibration which is input to the vibration damping device 1 in the long-side direction X.

In addition, since the main body rubber 32 of the elastic body 30 is formed in a rectangular parallelepiped shape having a rectangular shape when viewed from the top, it is possible to reduce the height in the vertical direction, while maintaining the volume of the elastic body 30, and the vibration damping device 1 can be downsized in the vertical direction. Further, of the main body rubber 32 of the elastic body 30, the short-side portions 32b located at both end portions in the long-side direction X, which are portions most deformed by shrinkage after vulcanization molding, are in contact with the frame-like member 11 in a non-adhering state. This makes it possible to prevent the short-side portion 32b of the main body rubber 32 from breaking due to shrinkage deformation after vulcanization molding or peeling off and separating from the frame-like member 11 in the long-side direction X.

In addition, the short-side portion 32b of the main body rubber 32 in the elastic body 30 is pre-compressed in the long-side direction X by the frame-like member 11. This makes it possible to prevent the short-side portion 32b of the main body rubber 32 from being separated from the frame-like member 11 due to vibration in the long-side direction X. Since the hardness of the short-side portion 13 of the elastic body 30 is hardened by pre-compression, it is possible to more reliably attenuate and absorb vibration in the long-side direction X.

Second Embodiment

Next, a vibration damping device 2 according to a second embodiment of the present invention will be described with reference to FIGS. 5 and 6. In the present embodiment, parts which are the same as constituent elements in the first embodiment are denoted by the same reference numerals, the description thereof will be omitted, and only differences will be described.

In the vibration damping device according to the present embodiment, an external member 20 includes a frame-like member 21, and a bracket 22 in which the frame-like member 21 is accommodated. As shown in FIG. 6, the bracket 22 includes a tubular accommodating portion 22a which opens in the short-side direction Y, and a leg portion 22b protruding downward from the accommodating portion 22a. The leg portion 22b gradually extends toward the outer side in the long-side direction X as it goes downward. Further, the accommodating portion 22a may close the opening on one side in the short-side direction Y.

The frame-like member 21, the tubular member 40 and the elastic body 30 are accommodated inside the accommodating portion 22a. The accommodating portion 22a has a rectangular shape that is long in the long-side direction X when viewed from the short-side direction Y. Of the circumferential wall portions of the accommodating portion 22a, the inner surfaces of the pair of short-side portions (the outer wall portions) 22c that face each other in the long-side direction X come into contact with the short-side portion 23 of the frame-like member 21 from the outer side in the long-side direction X. Further, the short-side portion 22c of the bracket 22 may be close to the short-side portion 23 of the frame-like member 21 on the outer side in the long-side direction X.

Figure 5:
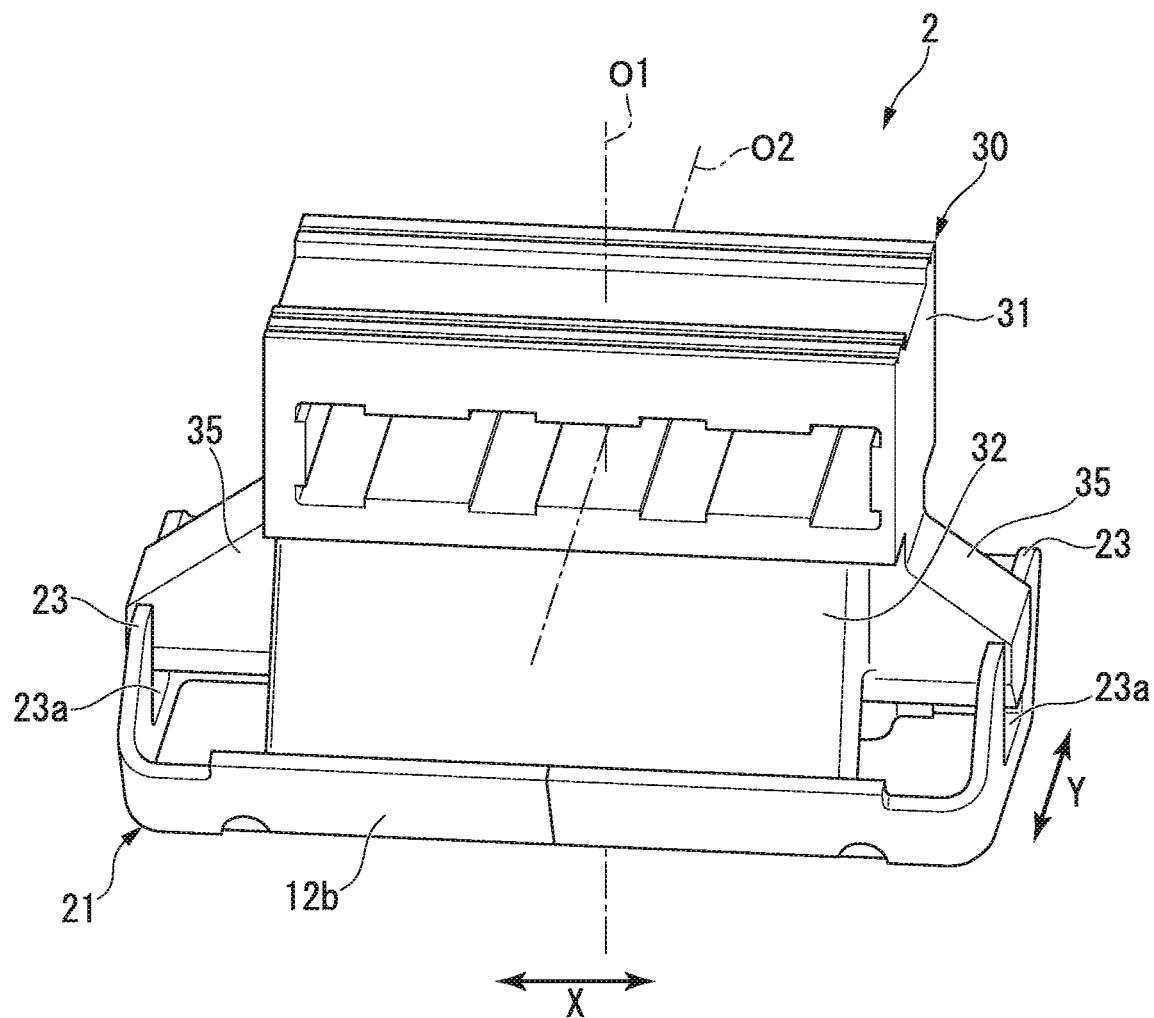
FIG. 5 is a perspective view showing a main part of a vibration damping device according to a second embodiment of the present invention.

Further, in this embodiment, as shown in FIG. 5, opening portions 23a that penetrate in the long-side direction X are formed in the short-side portion 23 of the frame-like member 21. The opening portions 23a are formed separately in the central portions of the pair of short-side portions 23 in the short-side direction Y, and open upward. Further, the protruding portion 35 of the elastic body 30 protrudes from the opening portion 23a in the short-side portion 23 of the frame-like member 21 toward the outer side in the long-side direction X, in the state of before being accommodated in the accommodating portion 22a of the bracket 22. The outer end portion of the protruding portion 35 in the long-side direction X protrudes upward from the opening portion 23a in the short-side portion 23 of the frame-like member 21, and is located above the lower end of the opening portion 23a. As shown in FIG. 6, the outer surface 35a of the protruding portion 35 comes into contact with the short-side portion 22c of the bracket 22. The protruding portion 35 is pre-compressed in the long-side direction X by the short-side portion 22c of the bracket 22.

Next, a method of manufacturing the vibration damping device 2 according to the present embodiment will be described. As shown in FIG. 5, when the elastic body 30 is molded by vulcanization by insert molding on the frame-like member 21, the tubular member 40 and the auxiliary fitting 50, the protruding portion 35 of the elastic body 30 is formed in the state of protruding from the opening portion 23a of the short-side portion 23 of the frame-like member 21 toward the outer side in the long-side direction X. Thereafter, as shown in FIG. 6, the frame-like member 21, the tubular member 40, and the elastic body 30 are integrally press-fitted into the accommodating portion 22a of the bracket 22 from the other side in the short-side direction Y, and the frame-like member 21, the tubular member 40 and the elastic body 30 are accommodated in the accommodating portion 22a of the bracket 22.

At this time, a portion of the protruding portion 35 of the elastic body 30, which protrudes from the opening portion 23a of the short-side portion 23 of the frame-like member 21 toward the outer side in the long-side direction X, is compressed toward the inner side in the long-side direction X, while being brought into sliding-contact with the inner circumferential surface of the short-side portion 22c of the bracket 22. As a result, the frame-like member 21, the tubular member 40, and the elastic body 30 are accommodated in the accommodating portion 22a of the bracket 22 in a state in which the protruding portion 35 is pre-compressed in the long-side direction X.

As described above, according to the vibration damping device 2 of the present embodiment, the protruding portion 35 of the elastic body 30 that protrudes from the opening portion 23a formed in the short-side portion 23 of the frame-like member 21 toward the outer side in the long-side direction X is pre-compressed to the short-side portion 22c of the bracket 22 in the long-side direction X. This makes it possible to suppress the short-side portion 32b of the main body rubber 32 in the elastic body 30 from being separated from the bracket 22 due to the vibration in the long-side direction X, a hardness of the short-side portion 32b of the main body rubber 32 in the elastic body 30 is hardened by pre-compression, and it is possible to more reliably attenuate and absorb vibration in the long-side direction X. Further, since the external member 20 of the vibration damping device 2 is provided with the bracket 22, the operability when mounting the vibration damping device 2 is improved.

The technical scope of the present invention is not limited to the above embodiments, and various modifications can be made within the scope that does not depart from the spirit of the present invention. For example, in the above embodiments, the elastic body 30 is pre-compressed to the external members 11 and 20 such as the frame-like member 11 or the bracket 22 in the long-side direction X, but the present invention is not limited to such a configuration. The elastic body may not be pre-compressed in the long-side direction and may come into contact with the external member.

In the above embodiments, the elastic body 30 was configured to include the covering portion 31 and the main body rubber 32, but the present invention is not limited to such an aspect. The elastic body may not have the covering portion and the main body rubber. In addition, it is possible to appropriately replace the constituent elements in the above embodiments with known constituent elements within the scope that does not deviate from the spirit of the present invention, and the above-described modifications may be appropriately combined.

INDUSTRIAL APPLICABILITY

According to the vibration damping device of the present invention, it is possible to reliably attenuate and absorb input vibration, regardless of the input direction of the vibration.

REFERENCE SIGNS LIST 1, 2 Vibration damping device
11, 21 Frame-like member
12 Long-side portion of frame-like member
13, 23 Short-side portion of frame-like member
20 External member
22 Bracket
22c Short-side portion of bracket (outer wall portion)
30 Elastic body
32a Long-side portion of main body rubber
32b Short-side portion of main body rubber
35 Protruding portion
40 Tubular member
O2 Central axis of tubular member
X Long-side direction
Y Short-side direction

The invention claimed is:

1. A vibration damping device, comprising:
an external member attached to one of a vibration-generating portion and a vibration-receiving portion;
a tubular member attached to the other of the vibration-generating portion and the vibration-receiving portion; and
an elastic body which connects the external member and the tubular member,
wherein the external member includes a frame member having a rectangular shape when viewed from a top,
the elastic body is formed in a rectangular parallelepiped shape having a rectangular shape when viewed from the top,
the tubular member is disposed inside the frame member when viewed from the top,
a central axis of the tubular member extends in a short-side direction in which a short-side portion of the frame member forming a short side of the rectangular shape when viewed from the top extends,
in the frame member, a lower end edge of a long-side portion forming a long side of the rectangular shape when viewed from the top is located on an inner side than an upper end edge of the long-side portion in the short-side direction, and
in the elastic body, a long-side portion forming a long side of the rectangular shape when viewed from the top adheres to an inner circumferential surface of the long-side portion of the frame member, and a short-side portion forming a short side of the rectangular shape when viewed from the top comes into contact with the external member in a long-side direction in which the long-side portion extends when viewed from the top, in a non-adhering state.

2. The vibration damping device according to claim 1, wherein the short-side portion of the elastic body is pre-compressed in the long-side direction by the external member.

3. The vibration damping device according to claim 1, wherein the external member includes an outer wall portion which is in contact with or in proximity to the short-side portion of the frame member from an outer side in the long-side direction, and
an opening portion penetrating in the long-side direction is formed in the short-side portion of the frame member,
a protruding portion protruding from the opening portion toward the outer side in the long-side direction is formed in the short-side portion of the elastic body, and the protruding portion is pre-compressed to the outer wall portion in the long-side direction.

4. The vibration damping device according to claim 2, wherein the external member includes an outer wall portion which is in contact with or in proximity to the short-side portion of the frame member from the outer side in the long-side direction, an opening portion penetrating in the long-side direction is formed in the short-side portion of the frame member, a protruding portion protruding from the opening portion toward the outer side in the long-side direction is formed in the short-side portion of the elastic body, and the protruding portion is pre-compressed to the outer wall portion in the long-side direction.

* * * * *